United States Patent
Park et al.

(10) Patent No.: US 8,798,096 B2
(45) Date of Patent: Aug. 5, 2014

(54) METHOD FOR CONFIGURING PREAMBLE FOR COMMUNICATION SYSTEM, PREAMBLER, AND APPARATUS FOR GENERATING PACKET USING THE SAME

(75) Inventors: Ki Hyuk Park, Daejon (KR); Bon Tae Koo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 483 days.

(21) Appl. No.: 12/970,700

(22) Filed: Dec. 16, 2010

(65) Prior Publication Data

US 2011/0150000 A1 Jun. 23, 2011

(30) Foreign Application Priority Data

Dec. 18, 2009 (KR) .................. 10-2009-0127542
Nov. 12, 2010 (KR) .................. 10-2010-0112648

(51) Int. Cl.
*H04J 3/24* (2006.01)

(52) U.S. Cl.
USPC .......................................... 370/474

(58) Field of Classification Search
None
See application file for complete search history.

(56) References Cited

U.S. PATENT DOCUMENTS

| | | | |
|---|---|---|---|
| 4,905,234 A * | 2/1990 | Childress et al. | 370/349 |
| 7,145,955 B1 | 12/2006 | Böhnke et al. | |
| 7,263,131 B2 * | 8/2007 | Ha et al. | 375/260 |
| 7,869,409 B2 * | 1/2011 | Ivonnet et al. | 370/335 |
| 2002/0172187 A1 * | 11/2002 | Shalvi et al. | 370/350 |
| 2005/0111522 A1 * | 5/2005 | Sung et al. | 375/145 |
| 2005/0187996 A1 * | 8/2005 | Yip et al. | 708/422 |
| 2006/0187909 A1 * | 8/2006 | Sho et al. | 370/389 |
| 2008/0170556 A1 * | 7/2008 | Schmidl et al. | 370/343 |
| 2009/0257518 A1 | 10/2009 | Lele et al. | |
| 2010/0008436 A1 * | 1/2010 | Zhang et al. | 375/260 |
| 2010/0216459 A1 * | 8/2010 | Yu et al. | 455/434 |
| 2012/0162014 A1 * | 6/2012 | Wu et al. | 342/387 |

FOREIGN PATENT DOCUMENTS

KR 10-0126092 B1 10/1997

* cited by examiner

*Primary Examiner* — Minh-Trang Nguyen

(57) ABSTRACT

Disclosed are a method for configuring a preamble for a communication system in order to effectively use a packet transmission bandwidth, a preambler, and an apparatus for generating a packet using the same. The preambler includes: a mode determining unit receiving frame characteristics information, extracting frame information to be transmitted through a preamble, and determining a transmission mode corresponding with the extracted information; and a code generation unit receiving the transmission mode information which has been determined by the mode determining unit and generating a preamble made up of a combination of sub-preamble code strings corresponding with the transmission mode.

20 Claims, 3 Drawing Sheets

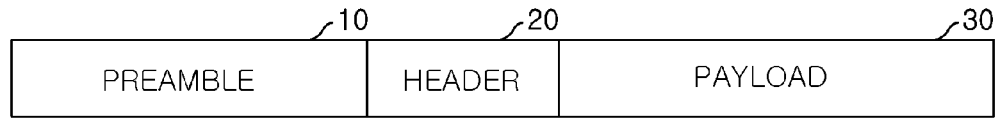
PRIOR ART
FIG. 1
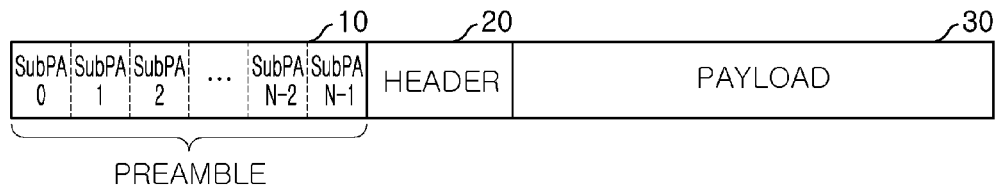
FIG. 2
| MODE | Sub PA0 | Sub PA1 | Sub PA2 |
|---|---|---|---|
| 0 | CODE 0 | CODE 0 | CODE 2 |
| 1 | CODE 0 | CODE 1 | CODE 2 |
| 2 | CODE 1 | CODE 0 | CODE 2 |
| 3 | CODE 1 | CODE 1 | CODE 2 |
| 4 | CODE 0 | CODE 0 | CODE 3 |
| 5 | CODE 0 | CODE 1 | CODE 3 |
| 6 | CODE 1 | CODE 0 | CODE 3 |
| 7 | CODE 1 | CODE 1 | CODE 3 |
FIG. 3

METHOD FOR CONFIGURING PREAMBLE FOR COMMUNICATION SYSTEM, PREAMBLER, AND APPARATUS FOR GENERATING PACKET USING THE SAME

CROSS-REFERENCE TO RELATED APPLICATIONS

This application claims the priority of Korean Patent Application Nos. 10-2009-0127542 filed on Dec. 18, 2009 and 10-2010-0112648 filed on Nov. 12, 2010, in the Korean Intellectual Property Office, the disclosures of which are incorporated herein by reference.

BACKGROUND OF THE INVENTION

1. Field of the Invention

The present invention relates to a method for configuring a preamble for a communication system, a preambler, and an apparatus for generating a data packet using the same, and more particularly, to a method for configuring a preamble structure for effectively configuring a preamble, a preambler for configuring a preamble according to the structure, and an apparatus for generating a packet using the preambler.

2. Description of the Related Art

FIG. 1 illustrates a frame structure of a transmission packet according to the related art.

With reference to FIG. 1, the related art transmission packet includes a preamble 10, a header 20, and a payload 30.

The preamble 10 is used for timing synchronization, frequency synchronization, and channel estimation between two or more communication systems.

The header 20 is used to transmit pieces of information regarding a transmission frame such as a data type, a transfer rate, a data length, an ID, an ARQ, a frame number, a CRC bit, and the like.

The payload 30 is used to transmit message data which is to be actually transmitted.

In a general frame-based block transmission and reception system, a preamble signal of a time domain or a frequency domain is disposed at the forefront of the packet as shown in FIG. 1. The transmitted preamble is used for frame synchronization, symbol synchronization, frequency offset estimation, or channel estimation by a receiver.

Thus, in order to enhance reception performance, the preamble is required to have such a length sufficient to perform the function. However, because a bandwidth allocated for one packet is limited, the bandwidth that may be used for a data transmission is inevitably reduced by the length of the preamble.

Also, because header information must be transmitted at every frame, reducing preamble and header overhead is an important task to improve the bandwidth of a high speed communication system.

SUMMARY OF THE INVENTION

An aspect of the present invention proposes a preamble frame structure capable of reducing the overhead of a preamble and a header, a method and preambler for configuring a preamble according to the proposed structure, and an apparatus for generating a packet using the same.

According to an aspect of the present invention, there is provided a preambler including: a mode determining unit receiving frame characteristics information, extracting frame information to be transmitted through a preamble, and determining a transmission mode corresponding with the extracted information; and a code generation unit receiving the transmission mode information which has been determined by the mode determining unit and generating a preamble made up of a combination of sub-preamble code strings corresponding with the transmission mode.

According to another aspect of the present invention, there is provided an apparatus for generating a packet, including: a preambler including a mode determining unit receiving frame characteristics information, extracting frame information to be transmitted through a preamble, and determining a transmission mode corresponding with the extracted information, and a code generation unit receiving the transmission mode information which has been determined by the mode determining unit and generating a preamble made up of a combination of sub-preamble code strings corresponding with the transmission mode; a header generation module receiving the frame characteristics information and generating a header by using information other than characteristics information transmitted through the preamble; and a payload generation module receiving data and generating a payload having a length obtained by subtracting the combination of the sub-preamble code strings and the length of the header from the packet length.

According to another aspect of the present invention, there is provided a method for configuring a preamble, including: a mode determining step of extracting frame information to be transmitted through a preamble from frame characteristics information and determining a transmission mode corresponding with the extracted frame information; and a code generation step of generating a sub-preamble code string corresponding with the transmission mode determined in the mode determining step.

BRIEF DESCRIPTION OF THE DRAWINGS

The above and other aspects, features and other advantages of the present invention will be more clearly understood from the following detailed description taken in conjunction with the accompanying drawings, in which:

FIG. 1 illustrates a frame structure of a transmission packet according to the related art;

FIG. 2 illustrates a packet frame structure according to an exemplary embodiment of the present invention;

FIG. 3 illustrates an example of configuration of a preamble of a packet frame according to an exemplary embodiment of the present invention;

DETAILED DESCRIPTION OF THE PREFERRED EMBODIMENT

Figure 4:
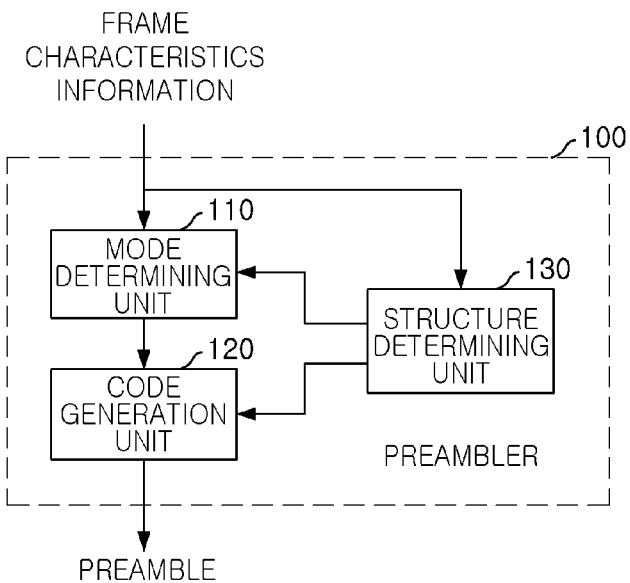
FIG. 4 is a schematic function block diagram of a preambler according to an exemplary embodiment of the present invention.

Exemplary embodiments of the present invention will now be described in detail with reference to the accompanying drawings. The invention may however be embodied in many different forms and should not be construed as being limited to the embodiments set forth herein. Rather, these embodiments are provided so that this disclosure will be thorough and complete, and will fully convey the scope of the invention to those skilled in the art.

In the drawings, the shapes and dimensions may be exaggerated for clarity, and the same reference numerals will be used throughout to designate the same or like components.

Unless explicitly described to the contrary, the word "comprise" and variations such as "comprises" or "comprising," will be understood to imply the inclusion of stated elements but not the exclusion of any other elements.

FIG. 2 illustrates a packet frame structure according to an exemplary embodiment of the present invention.

With reference to FIG. 2, the packet frame may be configured to include a preamble 10 composed of a plurality of sub-preambles Sub PA 0 to Sub PA N−1, a header 20, and a payload 30.

The preamble 10 is formed as the combination of the plurality of sub-preambles Sub PA 0 to Sub PA N−1 and each of the sub-preambles is assigned a single sub-preamble code string.

A plurality of transmission modes may be expressed by using a combination of sub-preamble code strings assigned to the sub-preambles. Each of the transmission modes includes one or more pieces of information among information (a data type, a transfer rate, a data length, an ID, an ARQ, a frame number, a CRC bit, and the like) regarding frame characteristics to be transmitted through the header. The relationship between the amount of information transmitted through the preamble and the transmission mode may be represented by Equation 1 shown below:

$$\text{Num(Mode)} \geq \text{Num(Info)} \qquad \text{[Equation 1]}$$

Here, Num(mode) is the number of transmission modes, and Num(info) is the amount of information transmitted through the preamble.

For example, when the amount of information regarding a data type transmitted through the preamble is 4, as in type 1 to type 4, the transmission modes of the preamble must be at least 4.

When the group of the sub-preamble code strings is {code 0, code 1, . . . , code L}, preferably, the respective sub-preamble code strings are L number of code strings which can be discriminated by a receiver through cross-correlation. Walsh codes are an example of the foregoing code strings.

Also, the sub-preamble code strings must have the code characteristics of general preamble code strings.

The number of sub-preambles is N, which is determined by Equation 2 shown below:

$$N \geq \log_L\{\text{Num(mode)}\} L \geq N \qquad \text{[Equation 2]}$$

Also, preferably, the number of code strings which may be assigned to a single sub-preamble is limited according to channel characteristics. In addition, a different combination of sub-preamble code strings may be assigned to each of the sub-preambles in each transmission mode.

For example, when channel characteristics are poor, two code strings are assigned to one sub-preamble to configure it like a binary signal. Namely, only code 0 and code 1 are assigned to the first sub-preamble Sub PA0, and only code 2 and code 3 are assigned to the second sub-preamble Sub PA1.

The header 20 transmits only information excluding the field part of the frame characteristics information transmitted through the preamble 10, so the length of the header 10 can be reduced compared with the related art packet frame structure. Thus, the bandwidth used for the preamble 10 and the header 20 can be advantageously reduced compared with the related art.

The payload 30 is generated by filling a portion, excluding the portions used by the preamble 10 and the header 20 of the bandwidth of the packet, with data.

The frame characteristics information to be transmitted through the preamble 10 may be defined to be fixed in constructing a communication system, or may be informed to the reception side (or receiver) when communication starts or periodically.

FIG. 3 illustrates an example of the configuration of a preamble of a packet frame according to an exemplary embodiment of the present invention.

With reference to FIG. 3, eight transmission modes (mode 0 to 8) are expressed by using three sub-preambles Sub PA 0 to Sub PA 2 and four sub-preamble code strings (code 0 to code 3).

Only sub-preamble code strings 0 and 1 are assigned to the sub-preambles 1 and 2 Sub PA 0 and Sub PA1, and only sub-preamble code strings 2 and 3 are assigned to the sub-preamble 3 Sub PA2.

FIG. 4 is a schematic function block diagram of a preambler according to an exemplary embodiment of the present invention.

With reference to FIG. 4, the preambler 100, according to an exemplary embodiment of the present invention, may be configured to include a mode determining unit 110 and a code generation unit 120. Also, the preambler 100 may further include a structure determining unit 130.

The mode determining unit 110 receives frame characteristics information, extracts frame information to be transmitted through the preamble, and determines a transmission mode corresponding with the extracted information.

The code generation unit 120 receives information regarding the transmission mode determined by the mode determining unit 110, and sequentially generates sub-preamble code strings corresponding with the transmission mode.

With reference to FIG. 3, it is assumed that the frame characteristics information to be transmitted through the preamble is a data type, a data type of a corresponding packet is 'data type 1' which is indicated by 'transmission mode 1', and the 'transmission mode 1' is a combination of sub-preamble codes in order of {code 0, code 0, code 1}. In this case, the mode determining unit 110 receives frame characteristics information, extracts data type information, and determines a transmission mode as the 'transmission mode 1' corresponding with the data type 1. The code generation unit 120 receives the 'transmission mode 1', information regarding the transmission mode, sequentially generates sub-preamble code strings {code 0, code 1, code 2} constituting corresponding preamble code strings, and outputs the same.

The structure determining unit 130 determines frame characteristics information to be transmitted through the preamble from the frame characteristics information and determines the number of sub-preambles, the number of transmission modes, sub-preamble code strings to be used, and the corresponding relationship between the transmission modes and the characteristics information. The structure determining unit 130 then transmits required information, among the determined matters, to the mode determining unit 110 and the code generation unit 120.

With reference to FIG. 3, the structure determining unit 130 determines to transmit information regarding the data type, among the frame characteristics information, through the preamble, and in order to transmit the data type information, the structure determining unit 130 determines three sub-preambles, eight transmission modes, and four sub-preamble code strings. Also, the structure determining unit 130 determines a data type corresponding to each of the transmission modes. The structure determining unit 130 transmits the matters with respect to the number of the transmission modes and the corresponding relationship between the transmission modes and data types to the mode determining unit 110 and the matters with respect to the corresponding relationship between the transmission modes and data types, the sub-preamble code strings, and the number of sub-preambles to the code generation unit 120.

Figure 5:
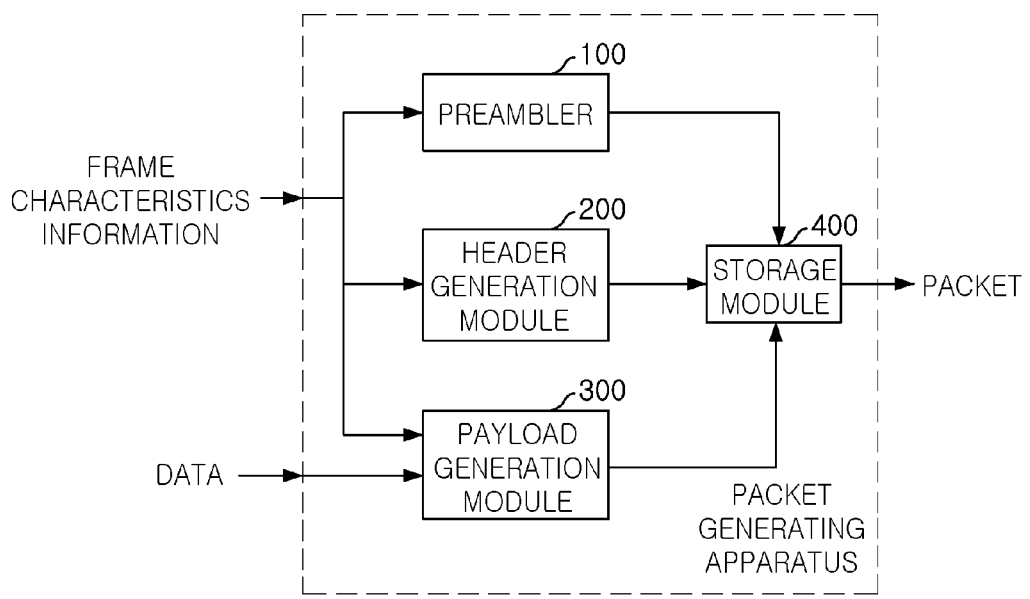
FIG. 5 is a schematic function block diagram of a packet generating apparatus using a preambler according to an exemplary embodiment of the present invention.

FIG. 5 is a schematic function block diagram of a packet generating apparatus using a preambler according to an exemplary embodiment of the present invention.

With reference to FIG. 5, the packet generating apparatus may be configured to include the preambler 100, a header generation module 200, and a payload generation module 300. The packet generating apparatus may further include a storage module 400.

The preambler 100 according to an exemplary embodiment of the present invention is a module for generating a preamble with a combination of the sub-preamble code strings in order to transmit a portion of the frame characteristics information through the preamble. The detailed function of the preambler 100 has been described, so its repeated description will be omitted.

The header generation module 200 according to an exemplary embodiment of the present invention receives the frame characteristics information and generates a header composed of information fields excluding the frame characteristics information transmitted through the preamble/

The payload generation module 300 receives the frame characteristics information and data, divides the data to fit the length of payload, thus generating the payload. The length of the payload is extracted from the frame characteristics information. In this case, however, when the length of the preamble and that of the header are fixed because the frame characteristics information to be transmitted through the preamble has been previously determined, or the like, the frame characteristics information may not be received additionally or separately.

The packet output from the packet generating apparatus must be output in order of the preamble, the header, and the payload, so it is designed such that the preambler 100, the header generation module 200, and the payload generation module 300 output all the data, respectively, and then, a next module performs outputting.

When the storage module 400 is additionally provided, it may receive all of the output data from the preambler 100, the header generation module 200, and the payload generation module 300, store the preamble, header, and the payload in this order, and output them in the form of the packet. Accordingly, the presence of the storage module 400 is advantageous in that the timing of the preambler 100, the header generation module 200, and the payload generation module 300 does not need to be precisely controlled.

When the packet generating apparatus is configured to include the preambler additionally having the structure determining unit 130 illustrated in FIG. 4, information regarding frame characteristics information to be transmitted through the preamble determined by the structure determining unit 130 is transmitted to the header generation module 200 and the payload generation module 300.

Upon receiving the information, the header generation module 200 determines the frame characteristics information transmitted through the header and a header length, and generates a header.

Upon receiving the information, the payload generation module 300 determines a payload length by using the information and the received frame characteristics information, divides the received data to fit a payload, thus generating the payload.

Figure 6:
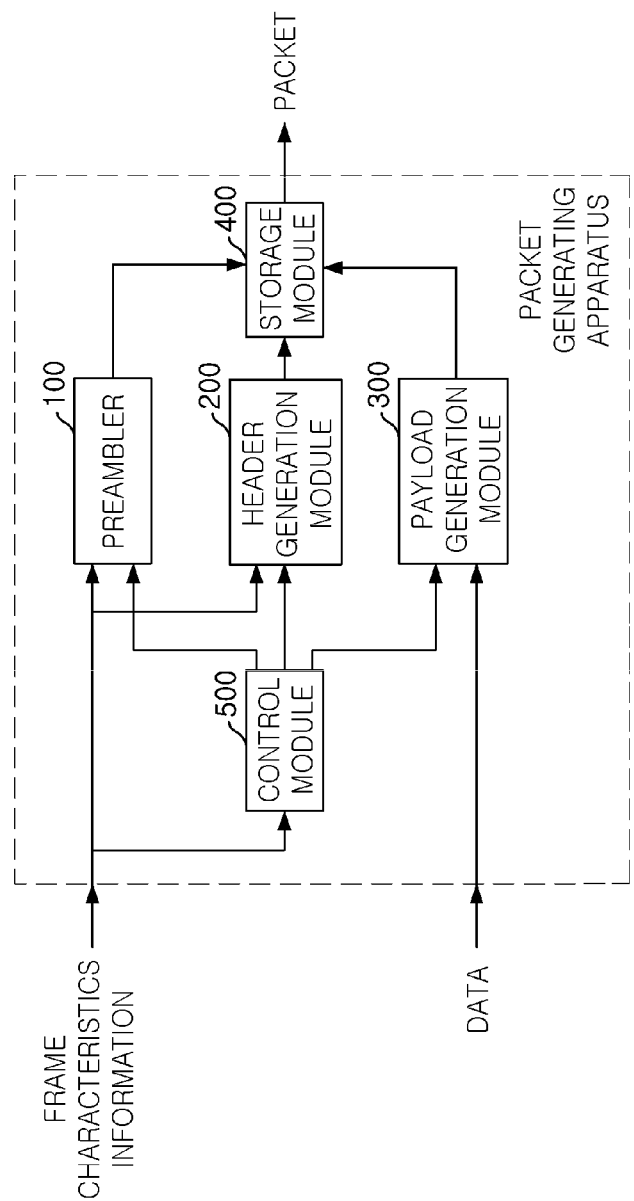
FIG. 6 is a schematic function block diagram of a packet generating apparatus using a preambler according to another exemplary embodiment of the present invention.

FIG. 6 is a schematic function block diagram of a packet generating apparatus using a preambler according to another exemplary embodiment of the present invention.

With reference to FIG. 6, the packet generating apparatus may be configured to include the preambler 100, the header generation module 200, the payload generation module 300, and a control module 500. The packet generating apparatus may further include the storage module 400.

The control module 500 determines frame characteristics information to be transmitted through the preamble among frame characteristics information, and transmits the determined frame characteristics information to the preambler 100, the header generation module 200, and the payload generation module 300. Also, the control module 500 determines a packet frame structure such as the lengths of the preamble, the header, and the payload, and the like, and controls the preambler 100, the header generation module 200, and the payload generation module 300 to generate a packet correspondingly according to the determined packet frame structure.

The preambler 100, the header generation module 200, and the payload generation module 300 generate a preamble, a header, and a payload according to the structure of the packet frame determined by the control module, respectively. The detailed functions of the preambler 100, the header generation module 200, and the payload generation module 300 have been described, so a repeated description thereof will be omitted.

When the storage module 400 is additionally provided, it may receive all of the output data from the preambler 100, the header generation module 200, and the payload generation module 300, store the preamble, header, and the payload in this order, and output them in the form of the packet.

A method for configuring a preamble according to an exemplary embodiment of the present invention may include a mode determining step and a code generating step.

In the mode determining step, frame information to be transmitted through a preamble, among frame characteristics information, is extracted, and a transmission mode corresponding with the extracted information is determined.

In the code generating step, sub-preamble code strings corresponding with the transmission mode determined in the mode determining step are sequentially generated.

The method for configuring a preamble according to an exemplary embodiment of the present invention may further include a structure determining step.

In the structure determining step, frame characteristics information to be transmitted through the preamble is determined from the frame characteristics information, and the number of sub-preambles, the number of transmission modes, the sub-preamble code strings to be used, and the corresponding relationship between the transmission modes and the characteristics information are also determined. The mode determining step and the code generating step are performed by using the determined matters.

As set forth above, in the method for configuring a preamble for a communication system, the preambler, and the apparatus for generating a packet according to exemplary embodiments of the invention, because information to be transmitted to a header through a preamble can be transmitted to the header, the length of the header can be reduced.

Also, because the bandwidth obtained by adding the preamble and the header is reduced, the bandwidth allotted to payload can be increased.

While the present invention has been shown and described in connection with the exemplary embodiments, it will be apparent to those skilled in the art that modifications and variations can be made without departing from the spirit and scope of the invention as defined by the appended claims.

What is claimed is:

1. A preambler comprising:
   a mode determining unit configured to receive frame characteristics information, extract frame information to be transmitted through a preamble, and determine a transmission mode corresponding to the extracted frame information; and
   a code generation unit configured to receive information of the transmission mode which has been determined by the mode determining unit and generate the preamble that includes a plurality of sub-preambles to which sub-preamble code strings are assigned,
   wherein the transmission mode is expressed by a combination of the sub-preamble code strings assigned to the sub-preambles.

2. The preambler of claim 1, wherein, in the combination of the sub-preamble code strings corresponding to the transmission mode, each of the sub-preambles is assigned different code strings.

3. The preambler of claim 1, wherein the combination of the sub-preamble code strings generated by the code generation unit includes code strings discriminated through cross-correlation.

4. The preambler of claim 1, further comprising:
   a structure determining unit configured to determine the frame information, to be transmitted through the preamble, among the frame characteristics information.

5. The preambler of claim 4, wherein the structure determining unit further determines a number of the sub-preambles, a number of transmission modes, sub-preamble code strings to be used, and a corresponding relationship between the transmission modes and the frame information to be transmitted through the preamble.

6. The preambler of claim 1, wherein the transmission mode includes one or more of frame information among frame characteristics information that can be transmitted through a header.

7. An apparatus for generating a packet, the apparatus comprising:
   a preambler including a mode determining unit that is configured to receive frame characteristics information, extract frame information to be transmitted through a preamble, and determine a transmission mode corresponding to the extracted frame information, and a code generation unit that is configured to receive information of the transmission mode which has been determined by the mode determining unit and generate the preamble including a plurality of sub-preambles to which sub-preamble code strings are assigned, a combination of the sub-preamble code strings corresponding to the transmission mode;
   a header generation module configured to receive the frame characteristics information and generate a header by using information other than the frame information transmitted through the preamble; and
   a payload generation module configured to receive data and generate a payload having a length obtained by subtracting the combination of the sub-preamble code strings and a length of the header from a packet length.

8. The apparatus of claim 7, wherein, in the combination of the sub-preamble code strings corresponding to the transmission mode, each of the sub-preambles is assigned different code strings.

9. The apparatus of claim 7, wherein the combination of the sub-preamble code strings generated by the code generation unit includes code strings discriminated through cross-correlation.

10. The apparatus of claim 7, wherein the preambler further comprises:
    a structure determining unit configured to determine the frame information, to be transmitted through the preamble, of the frame characteristics information.

11. The apparatus of claim 10, wherein the structure determining unit further determines a number of the sub-preambles, a number of transmission modes, sub-preamble code strings to be used, and a corresponding relationship between the transmission modes and the frame information to be transmitted through the preamble.

12. The apparatus of claim 7, further comprising:
    a storage module configured to receive output data from the preambler, the header generation module, and the payload generation module, store the preamble, the header, and the payload, and output the data in the form of a packet.

13. The apparatus of claim 7, wherein the transmission mode includes one or more of frame information among frame characteristics information that can be transmitted through the header.

14. A method for configuring a preamble, the method comprising:
    extracting frame information to be transmitted through a preamble from frame characteristics information and determining a transmission mode corresponding to the extracted frame information; and
    generating sub-preamble code strings corresponding to the determined transmission mode, and generating the preamble including a plurality of sub-preambles to which the sub-preamble code strings are assigned,
    wherein the transmission mode is expressed by a combination of the sub-preamble code strings assigned to the sub-preambles.

15. The method of claim 14, further comprising:
    determining the frame information to be transmitted through the preamble among the frame characteristics information.

16. The method of claim 15, wherein determining the frame information includes determining a number of the sub-preambles, a number of transmission modes, sub-preamble code strings to be used, and a corresponding relationship between the transmission modes and the frame information to be transmitted through the preamble.

17. The method of claim 14, wherein the combination of the sub-preamble code strings includes code strings discriminated through cross-correlation.

18. The method of claim 14, wherein, in determining the transmission mode, a transmission mode corresponding to a combination of one or more of frame information to be transmitted through a packet header is determined among the frame characteristics information.

19. The method of claim 14, wherein, in the combination of the sub-preamble code strings corresponding to the transmission mode, each of the sub-preambles is assigned different code strings.

20. The method of claim 14, wherein the transmission mode includes one or more of frame information among frame characteristics information that can be transmitted through a header.

* * * * *